US006926248B2

(12) United States Patent
Lehofer

(10) Patent No.: US 6,926,248 B2
(45) Date of Patent: Aug. 9, 2005

(54) PISTON ENGINE

(76) Inventor: Gerhard Lehofer, Räftlistrasse 673 b, 3655 Sigriswil (CH)

( * ) Notice: Subject to any disclaimer, the term of this patent is extended or adjusted under 35 U.S.C. 154(b) by 108 days.

(21) Appl. No.: 10/221,100

(22) PCT Filed: Feb. 15, 2001

(86) PCT No.: PCT/CH01/00102

§ 371 (c)(1),
(2), (4) Date: Dec. 30, 2002

(87) PCT Pub. No.: WO01/69063

PCT Pub. Date: Sep. 20, 2001

(65) Prior Publication Data

US 2003/0106506 A1 Jun. 12, 2003

(30) Foreign Application Priority Data

Mar. 15, 2000 (EP) .......................................... 00810219

(51) Int. Cl.[7] .............................................. F16K 25/00
(52) U.S. Cl. ........................................................ 251/87
(58) Field of Search ................................ 74/53; 251/87

(56) References Cited

U.S. PATENT DOCUMENTS

| | | | | |
|---|---|---|---|---|
| 1,738,512 A | * | 12/1929 | Andrews | 74/53 |
| 1,770,311 A | | 7/1930 | Keith | |
| 1,772,531 A | * | 8/1930 | Williams | 74/57 |
| 1,777,580 A | * | 10/1930 | Russell | 251/87 |
| 1,810,017 A | | 6/1931 | Houston | |
| 4,103,556 A | * | 8/1978 | Niday | 74/25 |
| 4,185,508 A | * | 1/1980 | Hardt | 74/53 |
| 5,743,220 A | | 4/1998 | Guarner-Lans | |

FOREIGN PATENT DOCUMENTS

| | | | | |
|---|---|---|---|---|
| DE | 937742 | | 1/1956 | |
| DE | 29817540 | | 1/1999 | |
| EP | 0702128 | | 3/1996 | |
| GB | 106472 | * | 3/1918 | 251/87 |
| WO | 8805858 | | 8/1988 | |
| WO | 9804820 | | 2/1998 | |

* cited by examiner

*Primary Examiner*—F. Daniel Lopez
(74) *Attorney, Agent, or Firm*—Stevens, Davis, Miller & Mosher, LLP

(57) ABSTRACT

A reciprocating engine having a housing, having at least two cylinders with inlet orifices and outlet orifices which are to be opened and are closable by means of controllable valves, in each of which cylinders a piston can be linearly reciprocated, and having at least one shaft rotatingly mounted in the housing, comprises a gear device by means of which the linear reciprocation of the pistons is convertible into a rotary motion of the shaft, or the rotary motion of the shaft is convertible into a linear reciprocation of the pistons. The gear device comprises a rocking lever which is pivotable about a centrally disposed swivel axis which is mounted in the housing, and on which rocking lever a rotatable roller is disposed at each of the two end areas, the axes of rotation of which rollers are each perpendicular to the swivel axis, which rollers roll on a track fixed to the shaft which is so disposed that it runs between the two rollers, and which track is provided with elevations and depressions which are so attuned to one another that the rollers disposed opposite one another on the rocking lever are in contact with the track, and that further one link rod is hinged to each of the two end areas of the rocking lever, which link rod is connected to the respective piston.

6 Claims, 6 Drawing Sheets

PISTON ENGINE

The present invention relates to a reciprocating engine according to the generic clause of patent claim 1.

Such reciprocating engines are known. In particular, reciprocating piston engines according to the Otto or diesel cycles are known, in which the linear reciprocating motion of the pistons is converted into a rotary motion via connecting rods which co-operate with a crankshaft. Thus the movement of the pistons runs sinusoidally, the course of movement of the pistons cannot be influenced, optimizing of the process of combustion, for example in combustion engines as regards low-pollutant combustion, cannot be achieved.

In EP-A-0 702 128 a mechanism is shown by means of which the linear reciprocating motion of the piston is converted via a cam into a rotary motion of a shaft. Through the use of a cam, the motion characteristic of the piston can be adapted to the desired process and optimized, but through the arrangement shown here, varying forces, especially transverse forces, act upon the walls of the piston, having a negative effect upon the frictional conditions, and thus the wear and tear on the respective friction surfaces is increased. Furthermore, the cam exhibits a great difference between largest radius and smallest radius, whereby the roller rolling thereon, if the shaft has essentially a constant angular velocity, is braked during a revolution of the shaft from a maximum speed to a minimum speed and is accelerated to the maximum speed again. In the case of fast-running engines, because of the inertia of the mass of the roller, slipping occurs here between the surface of the roller and the surface of the cam, whereby here, too, the wear and tear becomes relatively great.

From Publication No. WO 88/05858, a combustion engine can be gathered in which the pistons are disposed working pair-wise opposite one other, and the linear reciprocating motion of which is transmitted via rollers fastened to the pistons to a curve which has the shape of an annular surface, which is provided with elevations and depressions, and which is fixed to the shaft. Through this choice of curve surfaces, the fluctuation of the speed of rotation of the rollers, which is very great with the use of cams described above, is substantially lessened. Through the use of cambered cylindrical rollers, as a result of which the bearing capacity declines very greatly, and whereby the drilling motion which would occur with cylindrical rollers can be avoided, axial shifting of the rollers in the rises of the cam continues to exist nonetheless, whereby relatively great wear and tear cannot be prevented. Furthermore, in this embodiment, too, a force of reaction acts via the piston on the cylinder wall, whereby high friction is created here as well.

In the publication WO 98/04820, a combustion engine is likewise shown which is constructed substantially the same as the one previously described, a rib set circularly on a cylindrical body being used instead of a curved track inset in a hollow cylinder. By means of this arrangement, however, exactly the same disadvantages are obtained as in the embodiment described previously.

Now, the task of the present invention consists in designing a reciprocating engine in such a way that the conversion of the linear reciprocating motion of the pistons into a rotary motion of the shaft and vice versa can be obtained in such a way that the friction and the wear and tear can be kept as low as possible. Furthermore, the construction of the mechanism necessary for this purpose shall be simple and cost-effective.

According to the invention, the solution of this task takes place by means of the features recited in patent claim 1.

Through the use of a rocking lever, the forces of reaction can be optimally absorbed by the housing, so that practically no laterally directed forces act upon the pistons.

An advantageous arrangement of the invention consists in the fact that the track on which the rollers roll runs in a hollow spherical cup, the center of which lies in the intersection of the swivel axis of the rocking lever with the axis of rotation of the shaft, and the surface of the track is directed radially toward the center, and that the two rollers have the shape of a frustum, the tip of the cone defined by the frustum likewise lying in the center defined above. An optimum rolling process of the rollers on the track is thereby achieved, no drilling motion occurs, axial shifting of the roller is avoided, the bearing capacity is high because of the line contact between roller and track, the wear and tear is kept extremely small.

A further advantageous arrangement of the invention consists in the fact that the link rod is in each case fixed to the respective piston and, in the area in which it is hinged to the rocking lever, is guided in a linear guideway which is aligned parallel to the cylinder axis. Optimum guidance of the pistons in the cylinder is thereby achieved, the friction between piston and cylinder is very slight, whereby the wear and tear and the efficiency are correspondingly improved.

Advantageously, the articulation between rocking lever and link rod is formed in such a way that the hinge point in the rocking lever is substantially slidable toward its swivel axis and away therefrom. The arcuate movement of the rocking lever and the linear movement of the link rod can thereby be balanced without any additional intermediate member.

A further advantageous arrangement of the invention consists in the fact that the rocking lever is formed of a frame, between the two parallel legs of which the shaft runs, and the two legs are each provided with a pivot pin by which the swivel axis is formed, and the pivot pins are each mounted in a bearing, which bearings are each held in a tongue, which tongues are fixed to the housing. By means of this design, optimum absorption of the forces deriving from the torque acting upon the rocking lever is achieved, the friction can be kept extremely low.

Advantageously, the bearings are formed adjustably in the tongues which are fixed to the housing, whereby the rocking lever becomes adjustable, and the two rollers can co-operate optimally with the track.

The shaft is advantageously provided with means for transmitting the rotary motion to further transmission elements, for example to the control of the valves and to the drive of further units.

A further task of the invention consists in providing a valve arrangement for opening and closing inlet and outlet orifices in a cylinder of a reciprocating engine, in particular a reciprocating engine of the type previously described, which is of simple construction and which has low wear and tear.

According to the invention, the solution of this task takes place by means of the features recited in claim 8. Through the use of a sealing plate which is hinged to a swiveling lever, and which in closed condition covers up the respective orifice in the cylinder, optimum sealing is achieved without complicated surfaces having to be ground superpositioned.

Advantageously, the sealing surface of the sealing plate is formed flat, the corresponding surface of the cylinder surface which surrounds the respective orifice may likewise be formed flat, these surfaces can be obtained easily.

A further advantageous arrangement of this valve arrangement consists in the fact that the sealing plate is kept movable relative to the swivel axis of the swiveling lever in such a way that the sealing surface of the sealing plate adjusts itself automatically relative to the surface surrounding the respective orifice. Optimum tightness is thereby achieved.

A further advantageous arrangement of the valve arrangement consists in the fact that affixed to the sealing plate is a counterweight which is so disposed that during the opening and closing movement of the sealing plate, it is essentially immobile relative to the rocking lever. Since practically no movement thus takes place between sealing plate and rocking lever, it is not necessary to provide for lubrication, whereby the construction is substantially simplified.

A further advantageous arrangement of the invention consists in the fact that at least the sealing plate is made of a ceramic material. By this means, the required temperature stability exists without cooling, warping and thermal stress in the sealing plate which might derive from cooling, are thus eliminated.

Embodiments of the devices according to the invention are explained in detail below by way of example with the aid of the appended drawing.

Figure 1:
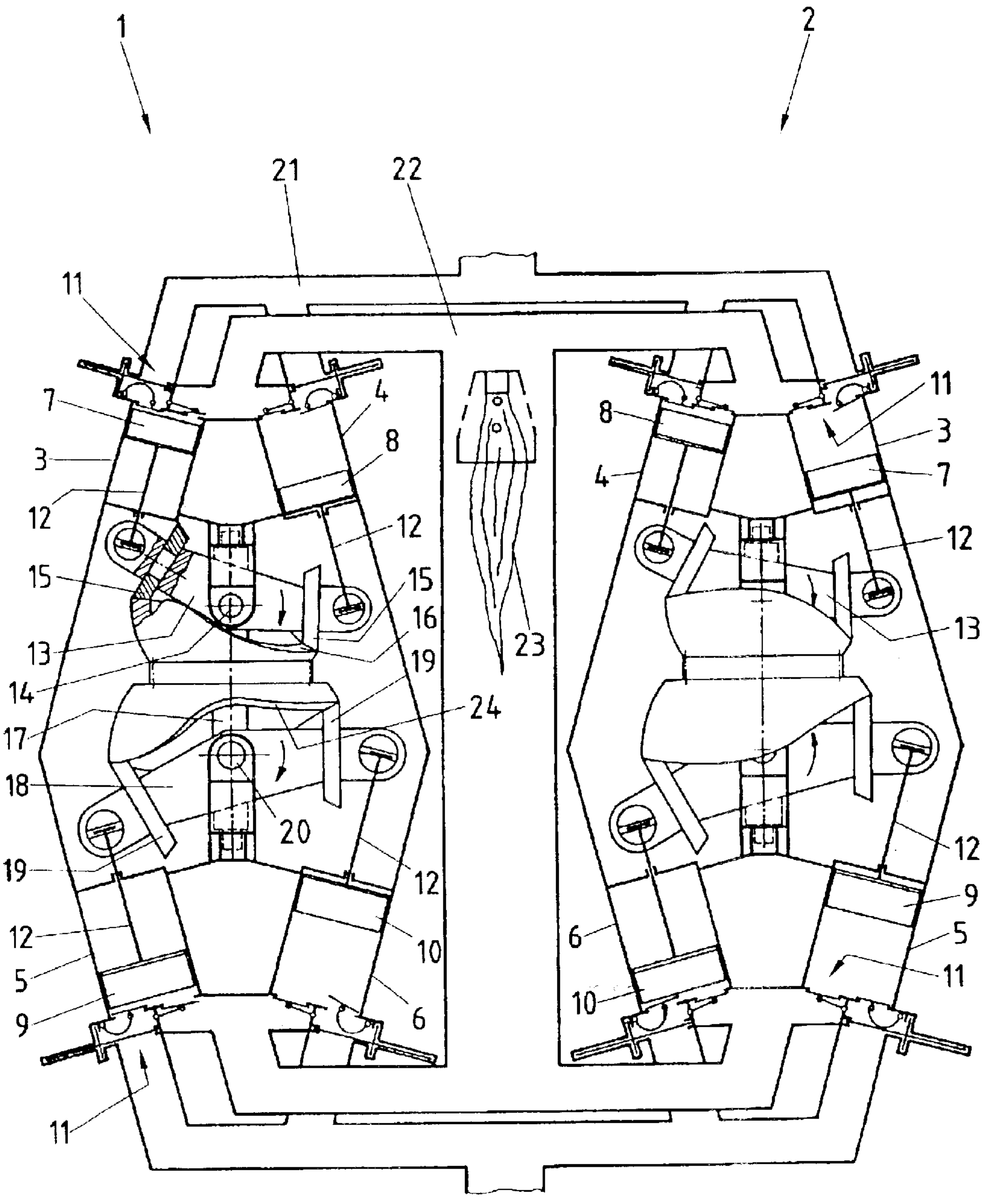
FIG. 1 shows diagrammatically a reciprocating engine according to the invention developed as a heating motor.

The reciprocating engine developed as a heating motor, as diagrammatically depicted in FIG. 1, comprises two groups 1 and 2 of four cylinders 3, 4, 5, and 6 each. In each cylinder 3, 4, 5, and 6 one piston 7, 8, 9, and 10, respectively, is slidingly disposed. Each cylinder 3 to 6 is provided with a valve arrangement 11 by means of which the inlet and outlet orifices of the respective cylinder 3 to 6 can be opened and closed, which valve arrangements 11 will be described in detail later on.

Fastened to each of the pistons 7, 8, 9, and 10 is a link rod 12. The link rod 12 connected to the piston 7 which moves in the cylinder 3 is hinged to an end area of a rocking lever 13. The link rod 12 of the piston 8 which moves in the cylinder 4 is hinged to the other end area of the rocking lever 13. The rocking lever 13 is pivotable in the middle about a swivel axis 14 held in the housing of the reciprocating engine, as will be described later on.

Likewise disposed at each of the two end areas of the rocking lever 13 is a roller 15, the axes of rotation of which are in each case perpendicular to the swivel axis 14 of the rocking lever 13. The rollers 15 roll on a track 16 which is fixed to a centrally disposed shaft 17 and which is provided with elevations and depressions, as will be described later on.

In the same way, the link rod 12 of the piston 9, which can reciprocate in the cylinder 5, is hinged to the end area of a further rocking lever 18, while the link rod 12 of the piston 10, which can reciprocate in the cylinder 6, is hinged to the other end area of the further rocking lever 18. This further rocking lever 18, too, is provided with rollers 19 in the same way as the rocking lever 13. The further rocking lever 18 is pivotable about the swivel axis 20, the axes of rotation of the rollers 19 are likewise perpendicular to this swivel axis 20 which is likewise held on the housing.

The rollers 19 likewise roll on a track 24 which is fixed to the shaft 17.

Hereafter the mode of operation of this heating motor will be described. Through rotation of the shaft 17, alternately by means of the piston 7 or 8, which can reciprocate in the cylinders 3 and 4, respectively, via the link rods 12 and the rocking lever 13, a gaseous medium is drawn in and compressed over an intake duct 21, the valve arrangement 11 opening and closing the inlet and outlet orifices, positively controlled. The compressed gas is discharged into a high-pressure chamber 22. By means of the arrangement of four cylinders 3 and 4 (two each per group 1 and group 2, respectively) and the appropriately laid out and formed track 16, each of the pistons 7 and 8 has at its disposal in each case a little more than a quarter of a revolution of the shaft 17 for pushing out the compressed gas, whereby the pushing out can take place at a low gas velocity, and the flow losses are correspondingly low. The course of the track 16 with its elevations and depressions is adapted here to the characteristic of the valve arrangement 11 and the respective flow conditions, so that a practically continuous and almost uniform gas current flows into the high-pressure chamber 22.

In the high-pressure chamber 22, heat is supplied to the compressed gas, which may take place, for example, through combustion of a suitable fuel in the high-pressure chamber 22, represented by reference character 23. However, the heat supply may also take place by means of a heat-exchanger which can be operated through an outside heat source. This outside heat source can be operated practically any way desired. By means of this heat supply, the combustion gas expands and flows via the valve arrangement 11 into the cylinders 5 and 6. The gas expands, the pistons 9 and 10 give way alternately and drive the shaft 17 via the link rod 12, via the further rocking lever 18, the rollers 19, and the track 24. The expanded gas leaves the cylinders 5 and 6 over the outlet orifices controlled by the valve arrangement 11. In the cylinders 5 and 6, too, the filling by the combustion gas in turn takes place through slow overflow and thereby with little loss of energy. The valve arrangements 11 are controlled in a known manner via the shaft 17 with the respective drive mechanism.

With such a heating motor, the gas can, for example, be heated in the high-pressure chamber at a pressure of app. 15 to 20 bar to a temperature of about 1500 Kelvin. The stroke volume of the cylinders which receive the heated gas is about 2.5 times as large as the stroke volume of the cylinders that draw in and compress the gas. The temperature of the gas flowing out then amounts to about 470 Kelvin.

Throttle disks 56 (FIG. 2) known per se can be inserted in the intake duct 21 in the area of the valve arrangements 11. Corresponding throttle disks are also inserted in the area of the valve arrangements 11 of the cylinders 5 and 6. The filling of the cylinders 3 and 4, which draw in and compress the gas, can thereby be influenced. In the case of non-complete filling, the compression pressure becomes lower, which leads to a lower pressure in the combustion chamber.

In the combustion chamber, enough heat is supplied so that a constant pressure arises in connection with the carrying off of the heated gas in the cylinders 5 and 6. This pressure can be measured and regulated via the heat supply. By means of the respective throttle disks, it can be avoided that gas can flow back into the cylinders 5 and 6.

In the example described above, an open gas circuit is described. Of course, it is also conceivable to arrange the heating motor with a closed circuit. Here the heat supply may take place by means of a heat-exchanger which, for example, is heated via solar energy. The gas discharged from the cylinders 5 and 6 might be supplied to a low-pressure chamber in which heat is withdrawn from the gas, whereafter this gas might be again fed to the cylinders 3 and 4.

Figure 2:
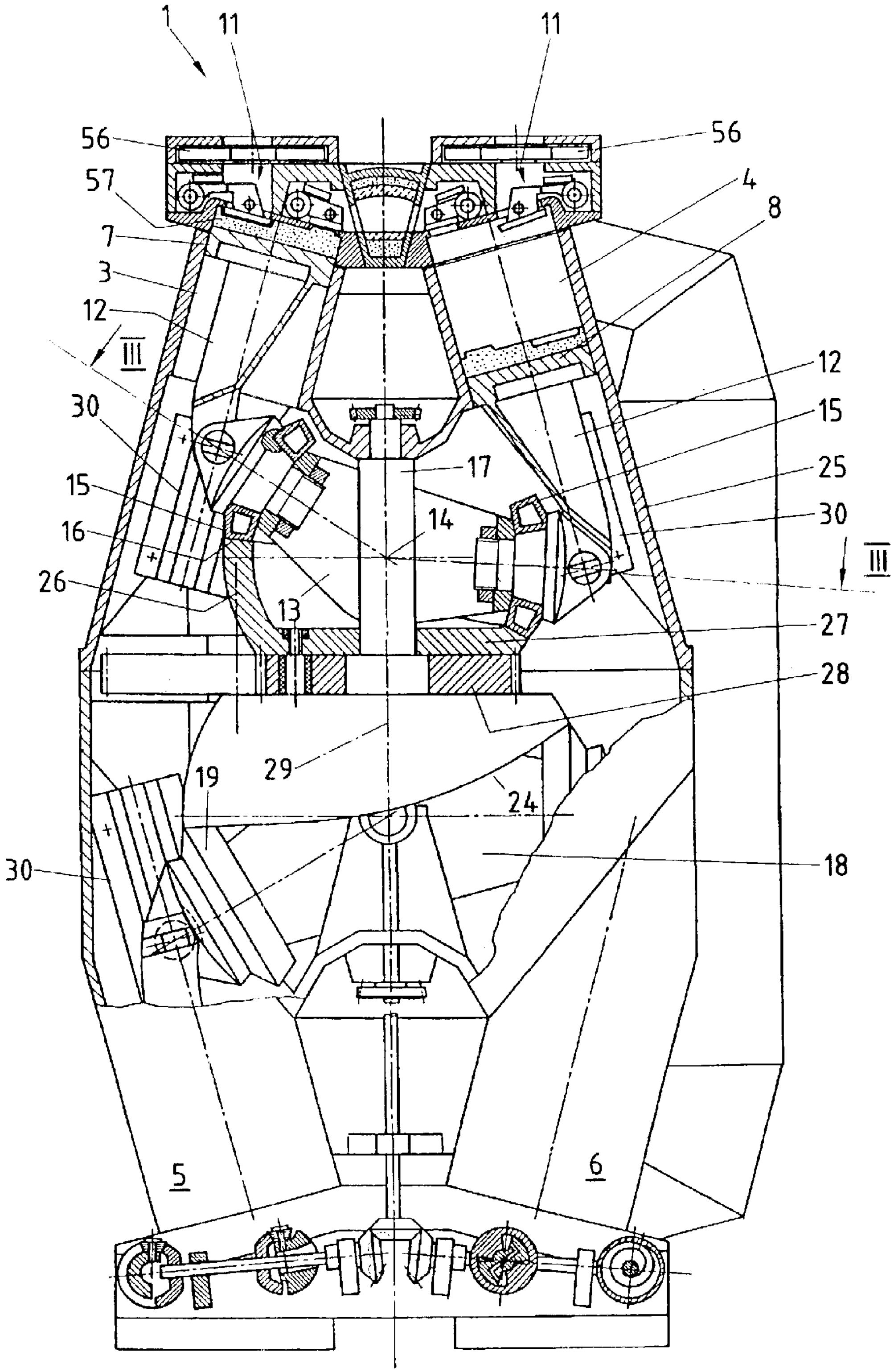
FIG. 2 shows a view of a group of the cylinder arrangement in constructional development, partially in section, of the heating motor according to FIG. 1.

It may be seen from FIG. 2, in which a group 1 of the reciprocating engine described in FIG. 1 is depicted, how the cylinders 3, 4, 5, and 6 and the shaft 17 are disposed in the housing 25. Likewise mounted on the housing 25 is the swivel axis, not shown, as will be described later on, about which the rocking lever 13 is pivotable. As already mentioned, the rollers 15 are rotatingly mounted each at an end area of the rocking lever 13 and roll on the track 16. This track 16 is formed as a kind of annular surface which is formed by a hollow spherical cup 26. This hollow spherical cup 26 has a flattened part 27, to which a gearwheel 28 is fastened, for example, and which is fixed to the shaft 17. The center of the hollow spherical cup 26 is situated in the intersection of the swivel axis 14 of the rocking lever 13 with the axis of rotation 29 of the shaft 17. The track 16 running in the hollow spherical cup 26, which has elevations and depressions, is thereby always at the same distance from the above-mentioned center.

These hollow spherical cups 26 with the flattened parts and the further gearwheels 28 etc. affixed to the shaft 17 serve simultaneously as a flywheel mass, whereby uniform running of the reciprocating engine is ensured.

The surface of the track 16 is always directed toward the center in radial direction. The rollers 15 that roll on the track 16 have the shape of a frustum, the tip of the cone defined by the frustum likewise lying in the center.

By means of this arrangement, optimum rolling conditions always result for the rollers 15 on the entire length of the track 16, thus no drilling motion of the roller comes about relative to the track, axial shifting of the roller is avoided, the wear and tear is thus very slight. Through the constant line contact between roller 15 and track 16, the bearing capacity is also great.

In the same way, the rollers 19, which are fastened to the further rocking lever 18, roll on a correspondingly shaped track 24, whereby the pistons 9 and 10 (FIG. 1) are reciprocated in the cylinders 5 and 6, so that a detailed description can be dispensed with. Here, too, an optimum rolling process of the rollers 19 on the respective track 24 is thus achieved.

The link rods 12 are fixed to the pistons 7 and 8, as is shown in FIG. 2. In the same way, the link rods 12 are also fixed to the pistons 9 and 10, which reciprocate in the cylinders 5 and 6. Therefore, in the area of the rocking lever 13 and 18, respectively, the link rod 12 is in each case guided in a linear guideway 30. The connection between link rod 12 and rocking lever 13 or 18 is so formed that the hinge point is substantially slidable toward and away from the swivel axis 14 or 20 of the rocking lever 13 or 18, respectively, so that the arcuate motion of the rocking lever 13 or 18 and the linear motion of the link rod 12 can be balanced without any additional intermediate member. Optimum running of the pistons 7, 8, 9, and 10 in the respective cylinders 3, 4, 5, and 6 is thereby achieved.

As may likewise be gathered from FIG. 2, the shaft 17 may drive still other units, as is shown in the lower part of FIG. 2, such as the control of the valve arrangements 11, for example.

As may furthermore be seen from FIG. 2, the piston surfaces of the pistons 7, 8, 9, and 10 may be provided with a heat-insulating coating 57. Analogously, the high-pressure chamber 22 (FIG. 1) may also be lined with heat-insulating material.

Figure 3:
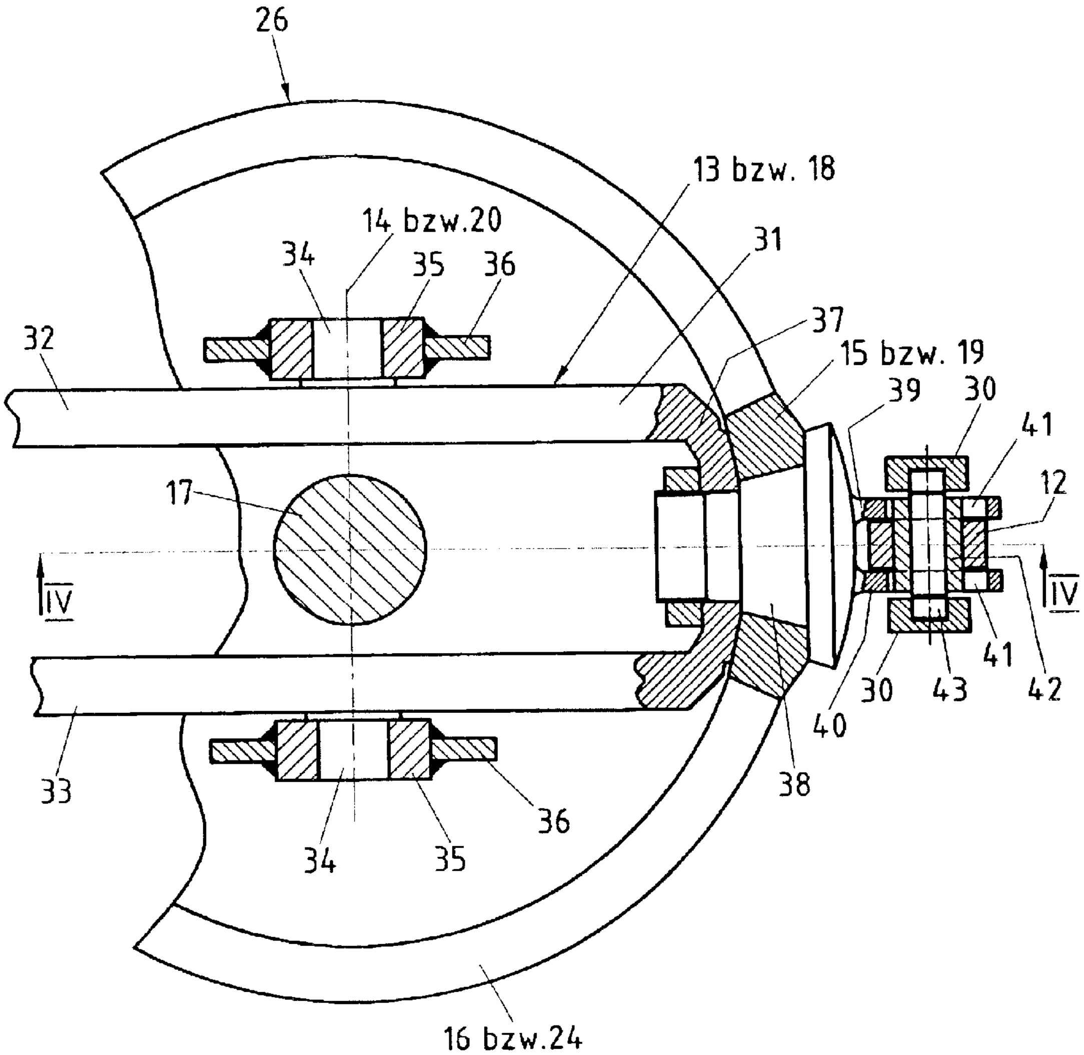
FIG. 3 shows a transverse section through the rocking lever taken on the line III—III of the representation according to FIG. 2.
Figure 4:
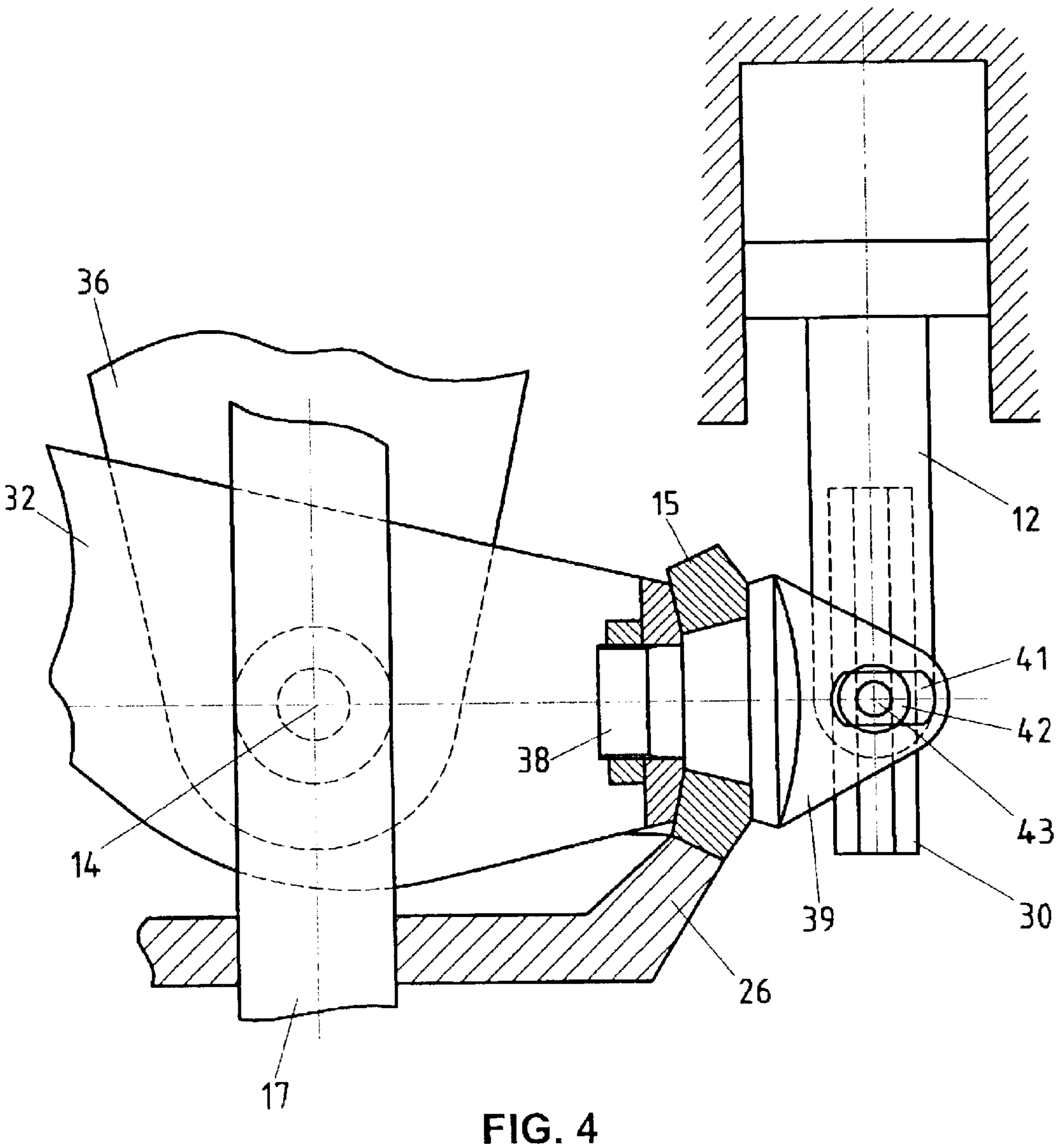
FIG. 4 is a transverse section taken on the line IV—IV through the rocking lever according to FIG. 3.

It may be seen from FIG. 3 that the rocking lever 13 and the further rocking lever 18 have the shape of a frame 31. This frame 31 is formed of two legs 32 and 33, between which the shaft 17 runs. To each of the two legs 32 and 33 a pivot pin is fastened which engages a bearing 35, each of which is held in a tongue 36, which tongue 36 is fastened to the housing. Thus the swivel axis 14 or 20 is thus formed by these two pivot pins 34.

Through the use of a rocking lever, merely two rollers are necessary for the transmission of motion between two pistons and the track, whereby the construction is simplified. In order to be able to achieve an optimum position of the rollers relative to the track, the bearings 35 in which the pivot pins of the rocking lever are mounted may be made adjustable in a known manner, for instance by means of setscrews.

The two legs 32 and 33 are connected to one another at the end area by means of a connecting piece 37. Fastened in this connecting piece 37 is a bearing pin 38 on which the roller 15 or 19 is mounted rotatingly and secured against axial displacement. Fastened to the bearing pin 38 are two flanges 39 and 40 which are each provided with a longitudinal slot 41. Inserted longitudinally displaceably in this longitudinal slot 41 is a bearing bush 42 in which an axle piece 43 is held. This axle piece 43 is guided on both sides in the linear guideways 30. Held to the bearing bush 42 is each respective end of the link rod 12. By means of this bearing, the arcuate swivel motion of the rocking lever 13 or 18 can be balanced with the linear motion of the link rod 12.

Figure 5:
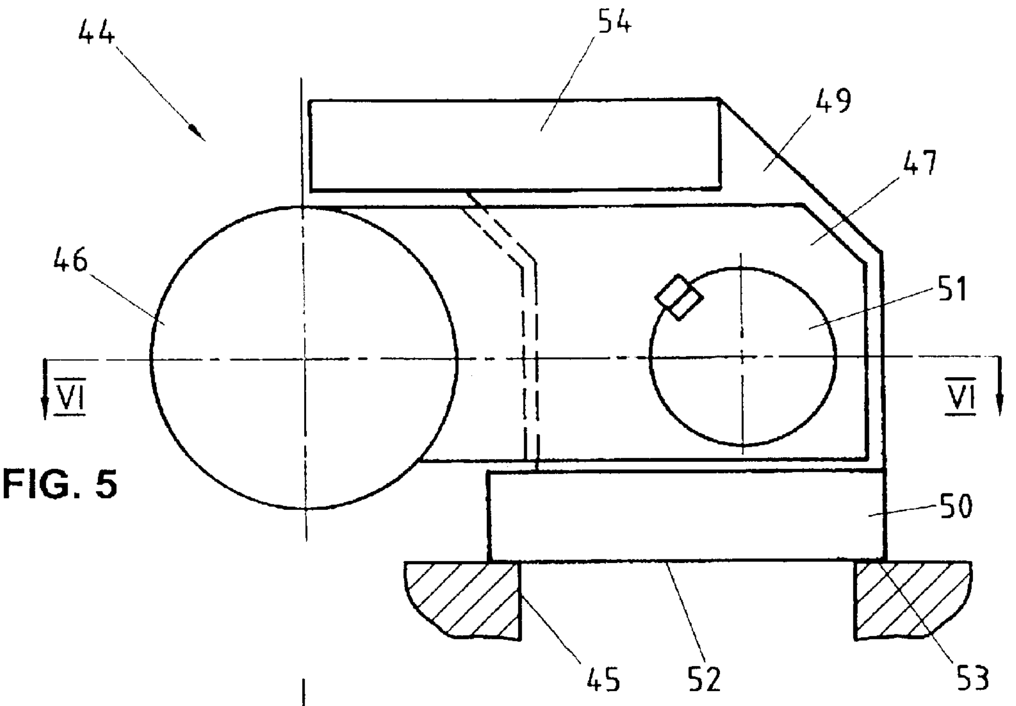
FIG. 5 is a view of a first embodiment of a valve arrangement.
Figure 6:
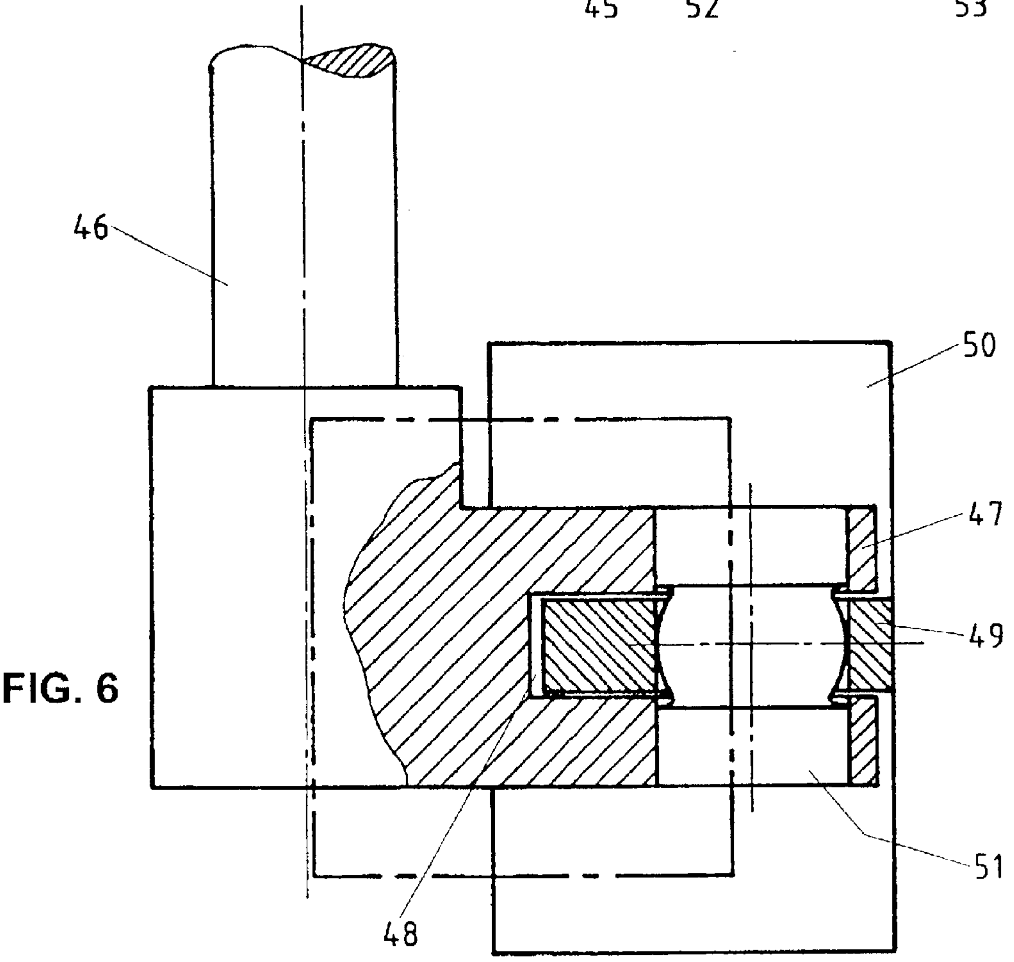
FIG. 6 is a top plan view of the valve arrangement according to FIG. 5, partially in section.

FIGS. 5 and 6 show a valve arrangement 44 by means of which an inlet and/or outlet orifice 45 in a cylinder of a reciprocating engine can be opened and closed. This valve arrangement 44 consists of a swivel axis 46 to which a lever 47 is fastened. The swivel axis 46 is swivelable relative to the respective cylinder and mounted stationary. The swiveling lever 47 is provided with a slit-shaped recess 48 in which a flange 49 comes to lie, which is fastened to the sealing plate 50. The swiveling lever 47 and the flange 49 are provided with a continuous bore in which an axle piece 51 is inserted. In the middle area, the axle piece 51 has a spherical shape on which the flange 49 is mounted. By means of the play provided between the slit-shaped recess 48 and the flange 49, the latter is pivotable to a slight extent about both the axis formed by the axle piece 51 and also an axis at right angles thereto.

The sealing plate 50 which closes the inlet and outlet orifices in closed condition is supported by its flat sealing surface 52 on the surface 53 of the cylinder surface surrounding the respective orifice 45. Through the possibility of swiveling the flange 49 relative to the axle piece 51, the sealing surface 52 of the sealing plate 50 adapts itself to the surface 53. Sealing thereby becomes optimal, machining of the sealing surfaces is accordingly simple. By means of this arrangement, heat expansions of the respective material can also be compensated for.

As already mentioned, opening and closing takes place via rotating of the swivel axis 46. The drive mechanism may have a known construction, also conceivable would be the use of a rocking lever with a roller which rolls on a track, as is used for moving the pistons in the reciprocating engine previously described.

Since these movements take place very rapidly in fast-running reciprocating engines, it should be avoided having the sealing plate 50 move too greatly relative to the axle piece 51. Therefore, a counterweight 54 is disposed on the flange 49 on the side opposite the sealing plate 50. This counterweight 54 is so disposed and designed that during the opening and closing movement of the valve arrangement, the sealing plate 50, the flange 49, and the counterweight 54 practically do not move relative to the axle piece 51 owing to inertia. Thus, neither is it necessary for a lubricating device to be provided, by means of which the bearing of the sealing plate would have to be lubricated. The construction of this valve arrangement is thereby simplified.

In order to be able to omit cooling as well, the material of the sealing plate 50, the flange 49, and the counterweight 54 may be chosen accordingly, for example it is advantageous to make this part of a ceramic material.

Figure 7:
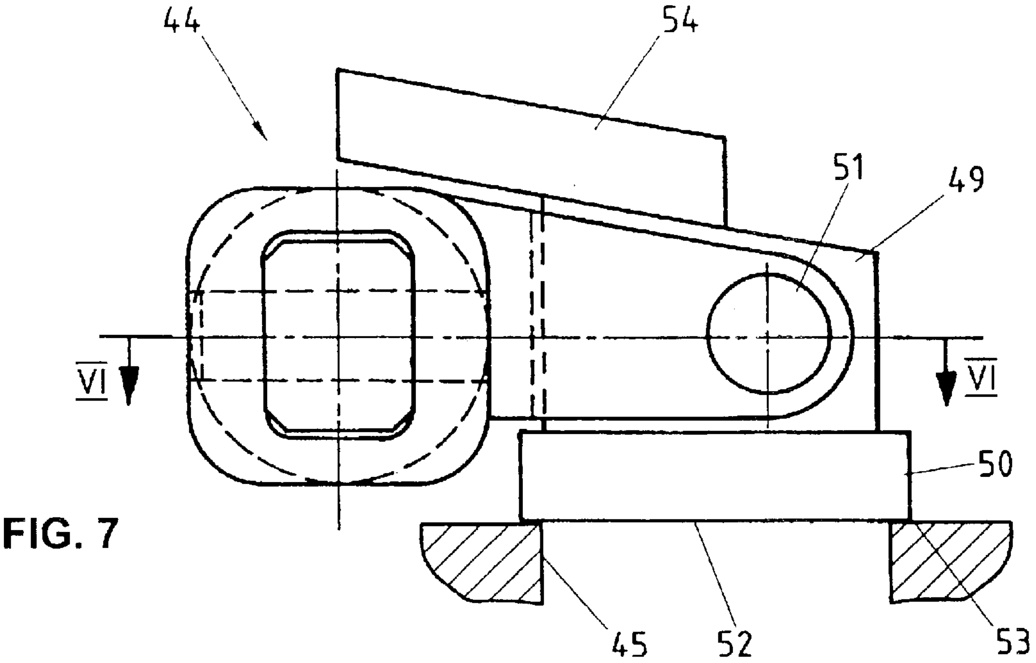
FIG. 7 is a view of a further embodiment of a valve arrangement.
Figure 8:
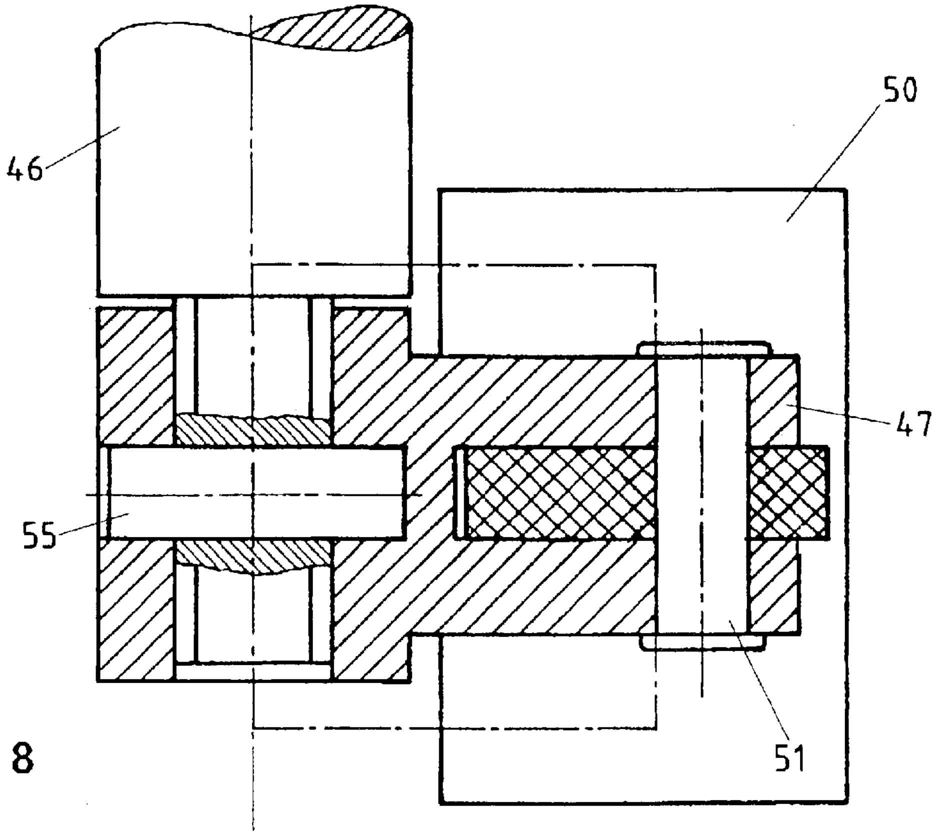
FIG. 8 is a top plan view of the valve arrangement according to FIG. 7, partially in section.

In FIGS. 7 and 8, an embodiment of a valve arrangement 44 is shown which has substantially the same construction as the one previously described, but with the axle pin 51 no longer being provided with a spherical middle piece and the sealing plate 50 thus being pivotable relative to this axle piece 51 only about one axis, and that the pivotability about the axis perpendicular to the axle piece 51 is achieved by means of a further pin 55 about which the swiveling lever 47 is slightly pivotable about the swivel axis 46. By this means as well, it is optimally achieved that the flat sealing surface 52 of the sealing plate 50 adapts to the surface 53. Here, too, it is achieved through affixing of the counterweight 54 that the sealing plate 50, the flange 49, and the counterweight 54 move as little as possible relative to the axes of rotation, so that lubrication can also be dispensed with here.

This valve arrangement 44 can be used for reciprocating engines of any kind, for example heating motors such as described previously, heat pumps, but also compressors, etc.

What is claimed is:

1. Valve arrangement for opening and closing inlet and outlet orifices in a cylinder of a reciprocating engine, wherein for each inlet or outlet orifice a lever pivotable about a swivel axis is provided, which swivel axis is mounted stationary relative to the cylinder, and to which swiveling lever a sealing plate is hinged, which in closed condition covers up the respective orifice in the cylinder, wherein affixed to the sealing plate is a counterweight which is so disposed that during the opening and closing movement of the sealing plate, the latter is substantially immobile relative to the swiveling lever.

2. Valve arrangement according to claim 1, wherein the sealing surface formed by the sealing plate is substantially flat and rests in closed condition on a corresponding surface of the cylinder surface surrounding the respective orifice.

3. Valve arrangement according to claim 1, wherein the sealing plate is kept movable relative to the swivel axis of the swivelable lever in such a way that the sealing surface of the sealing plate adjusts itself automatically relative to the surface surrounding the respective orifice.

4. Valve arrangement according to claim 1, wherein at least the sealing plate is made of a ceramic material.

5. Valve arrangement for opening and closing inlet and outlet orifices in a cylinder of a reciprocating engine said reciprocating engine having a housing comprising at least two cylinders having inlet orifices and outlet orifices which are to be opened and are closable by means of controllable valves, in each of which cylinders a piston can be linearly reciprocated, and at least one shaft rotatingly mounted in the housing, and in which the pistons and the shaft are coupled to one another via a transmission device, by means of which transmission device the linear reciprocation of the pistons is convertible into rotary motion of the shaft, or the rotary motion of the shaft is convertible into a linear reciprocation of the pistons, wherein the transmission device comprises a rocking lever which is pivotable about a centrally disposed swivel axis which is mounted in the housing, and on which rocking lever a rotatable roller is disposed at each of the two end areas, the axes of rotation of which rollers are each perpendicular to the swivel axis, which rollers roll on a track fixed to the shaft which is so disposed that it runs between the two rollers, and which track is provided with elevations and depressions which are so attuned to one another that the rollers disposed opposite one another on the rocking lever are in contact with the track, and further one link rod is hinged to each of the two end areas of the rocking lever, which link rod is connected to the respective piston, wherein for each inlet or outlet orifice a lever pivotable about a valve swivel axis is provided, which valve swivel axis is mounted stationary relative to the cylinder, and to which swiveling lever a sealing plate is hinged, which in closed condition covers up the respective orifice in the cylinder and further, wherein affixed to the sealing plate is a counterweight which is so disposed that during the opening and closing movement of the sealing plate, the latter is substantially immobile relative to the swiveling lever.

6. Valve arrangement according to claim 5, wherein at least the sealing plate is made of a ceramic material.

* * * * *